United States Patent
Stutzman et al.

(10) Patent No.: US 11,976,760 B2
(45) Date of Patent: May 7, 2024

(54) RETENTION APPARATUS

(71) Applicant: DEERE & COMPANY, Moline, IL (US)

(72) Inventors: Lowell D. Stutzman, Cedar Falls, IA (US); Trent L. Goodnight, Hudson, IA (US); Clayton P. Neumann, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 723 days.

(21) Appl. No.: 17/094,124

(22) Filed: Nov. 10, 2020

(65) Prior Publication Data

US 2022/0146027 A1 May 12, 2022

(51) Int. Cl.
| | |
|---|---|
| F16L 3/00 | (2006.01) |
| F16L 3/18 | (2006.01) |
| F16L 3/12 | (2006.01) |
| H02G 3/32 | (2006.01) |
| F16L 33/207 | (2006.01) |
| B60R 16/02 | (2006.01) |

(52) U.S. Cl.
CPC ...... F16L 33/2078 (2013.01); B60R 16/0215 (2013.01); F16L 3/00 (2013.01); F16L 3/1226 (2013.01); F16L 3/18 (2013.01); H02G 3/32 (2013.01)

(58) Field of Classification Search
CPC ....... F16L 33/2078; F16L 3/00; F16L 3/1226; F16L 3/18; B60R 16/0215; H02G 3/32
USPC .................... 138/106; 248/72, 74.1; 411/433
See application file for complete search history.

(56) References Cited

U.S. PATENT DOCUMENTS

| | | | |
|---|---|---|---|
| 2,135,360 A | 11/1938 | Taylor | |
| 2,475,230 A | 7/1949 | Frey et al. | |

(Continued)

FOREIGN PATENT DOCUMENTS

| | | |
|---|---|---|
| DE | 1405988 A1 | 4/1969 |
| DE | 2138154 A | 2/1973 |

(Continued)

OTHER PUBLICATIONS

Maclean Power Systems, Line Post Clamps, [online], Retrieved from the Internet: <URL: https://www.macleanpower.com/product/transmission-insulators/line-post-transmission-insulators/line-post-clamps>.

(Continued)

Primary Examiner — David R Deal

(57) ABSTRACT

A retaining apparatus includes a barrier having an interior surface defining an aperture extending from a first end of the barrier to a second end of the barrier. The retaining apparatus has a first distance between opposing sides of the interior surface near the first end of the barrier, a second distance between the opposing sides of the interior surface at a position between the first and second ends of the barrier, and a third distance between the opposing sides of the interior surface at the second end of the barrier. The second distance is smaller than the first and third distances. The interior surface is configured to partially surround and support a work line, restricting movement of the work line in a transverse direction, allowing movement of the work line in a longitudinal direction, and allowing bending of the work line about an axis in the transverse direction.

13 Claims, 8 Drawing Sheets

(56) References Cited

U.S. PATENT DOCUMENTS

| | | | | |
|---|---|---|---|---|
| 2,943,833 A * | 7/1960 | Ramse | ............ | F16L 3/00 |
| | | | | 248/89 |
| 5,544,849 A * | 8/1996 | Peterson | ............ | F16L 3/12 |
| | | | | 248/74.1 |
| 6,717,055 B2 * | 4/2004 | Kato | ............ | H02G 3/32 |
| | | | | 173/136 |
| 9,394,748 B2 * | 7/2016 | Heyward | ............ | E21B 19/002 |
| 10,190,703 B2 * | 1/2019 | Alquier | ............ | F16L 3/16 |
| 10,632,594 B2 | 4/2020 | Short | | |
| 2006/0284027 A1 * | 12/2006 | Smith | ............ | F16L 3/04 |
| | | | | 248/65 |
| 2013/0048296 A1 * | 2/2013 | Heyward | ............ | E21B 19/002 |
| | | | | 166/345 |
| 2018/0264630 A1 * | 9/2018 | Short | ............ | F16L 3/1091 |

FOREIGN PATENT DOCUMENTS

| | | |
|---|---|---|
| DE | 19915748 A1 | 1/2001 |
| DE | 102012015888 A1 | 2/2014 |

OTHER PUBLICATIONS

German Search Report issued in application No. DE102021211180.7, dated May 10, 2022, 10 pages.

* cited by examiner

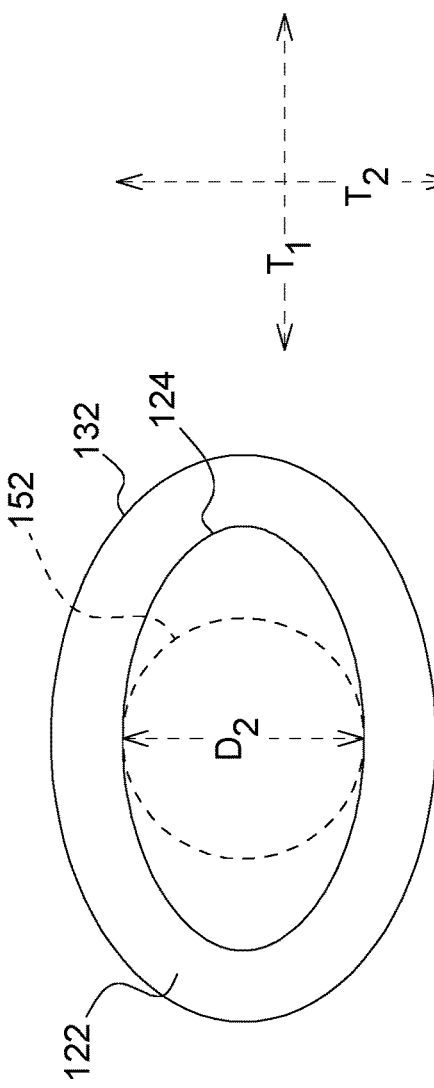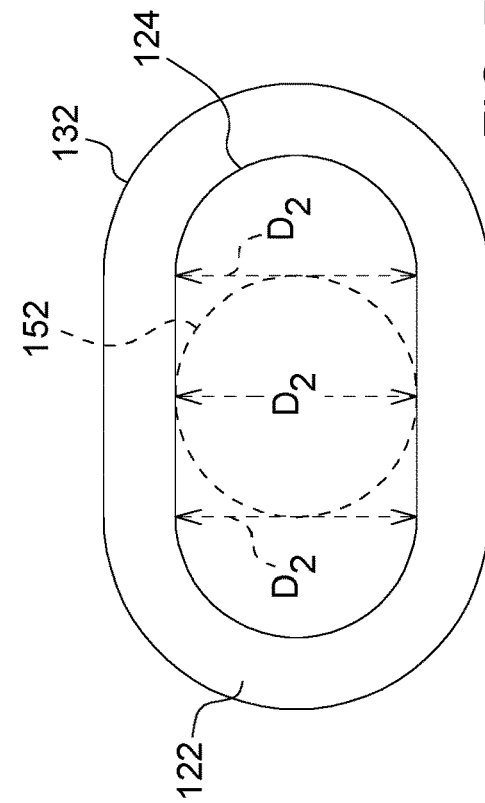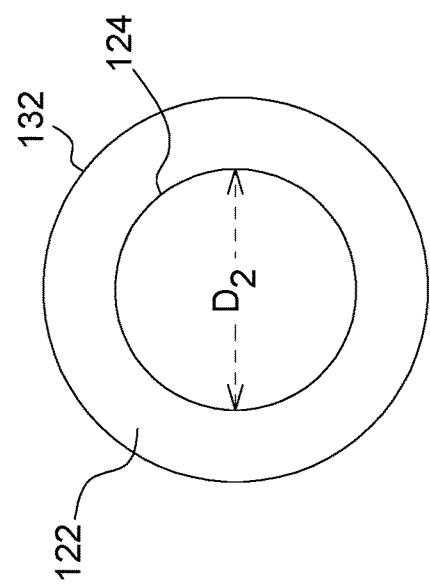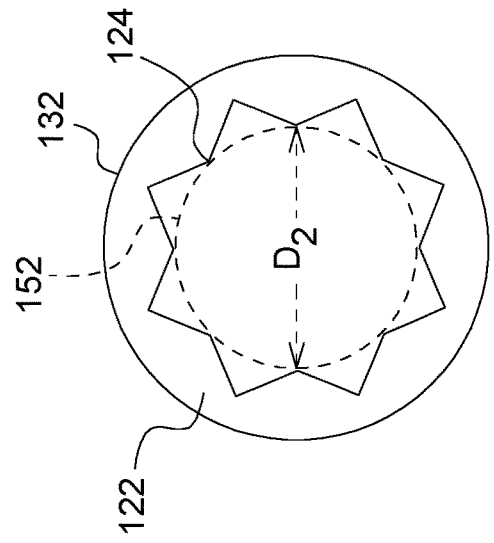

RETENTION APPARATUS

CROSS-REFERENCE TO RELATED APPLICATIONS

N/A

FIELD OF THE DISCLOSURE

The present disclosure relates to a retention apparatus for a work line in a work vehicle or implement.

BACKGROUND

Some work vehicles and implements may include one or more hoses, cables, tubes, wires, flexible pipes, conduits, or other work lines. These work lines may have one end connected to one component of the work machine and a second end connected to another component of the work machine. These work lines may be routed around the work vehicle between the components and coupled to the work vehicle with clamps.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a retention apparatus for a work line in a work vehicle or implement.

According to an aspect of the present disclosure, a retention apparatus includes a barrier having an interior surface defining an aperture extending from a first end of the barrier to a second end of the barrier. The retention apparatus has a first distance between opposing sides of the interior surface near the first end of the barrier, a second distance between the opposing sides of the interior surface at a position between the first and second ends of the barrier; and a third distance between the opposing sides of the interior surface at the second end of the barrier. The second distance is smaller than the first and third distances. The interior surface is configured to partially surround and support a work line, restricting movement of the work line in a transverse direction, allowing movement of the work line in a longitudinal direction, and allowing bending of the work line about an axis in the transverse direction.

According to an aspect of the present disclosure, the interior surface curves from the first end to the second end of the barrier, wherein the aperture is wider at the first and second ends than between the first and second ends.

According to an aspect of the present disclosure, an exterior surface of the barrier includes a channel around a portion of the circumference.

According to an aspect of the present disclosure, an exterior surface of the barrier is cylindrical.

According to an aspect of the present disclosure, the second distance is positioned halfway between the first and second ends of the barrier.

According to an aspect of the present disclosure, the second distance is positioned closer to the first end of the barrier than the second end of the barrier.

According to an aspect of the present disclosure, a cross-section of the retaining apparatus at the position of the second distance is circular.

According to an aspect of the present disclosure, a cross-section of the retaining apparatus at the position of the second distance is non-circular.

According to an aspect of the present disclosure, the first distance is the same as the third distance.

According to an aspect of the present disclosure, the first distance is larger than the third distance.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which:

FIGS. 7A-7D are cross-sectional views along a transverse plane, according to an implementation.

Like reference numerals are used to indicate like elements throughout the several figures.

DETAILED DESCRIPTION

The implementations disclosed in the above drawings and the following detailed description are not intended to be exhaustive or to limit the disclosure to these implementations. Rather, there are several variations and modifications which may be made without departing from the scope of the present disclosure.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps, which may be comprised of any number of hardware, software, and/or firmware components configured to perform the specified functions.

Terms of degree, such as "generally", "substantially" or "approximately" are understood by those having ordinary skill in the art to refer to reasonable ranges outside of a given value or orientation, for example, general tolerances or positional relationships associated with manufacturing, assembly, and use of the described implementations.

Figure 1:
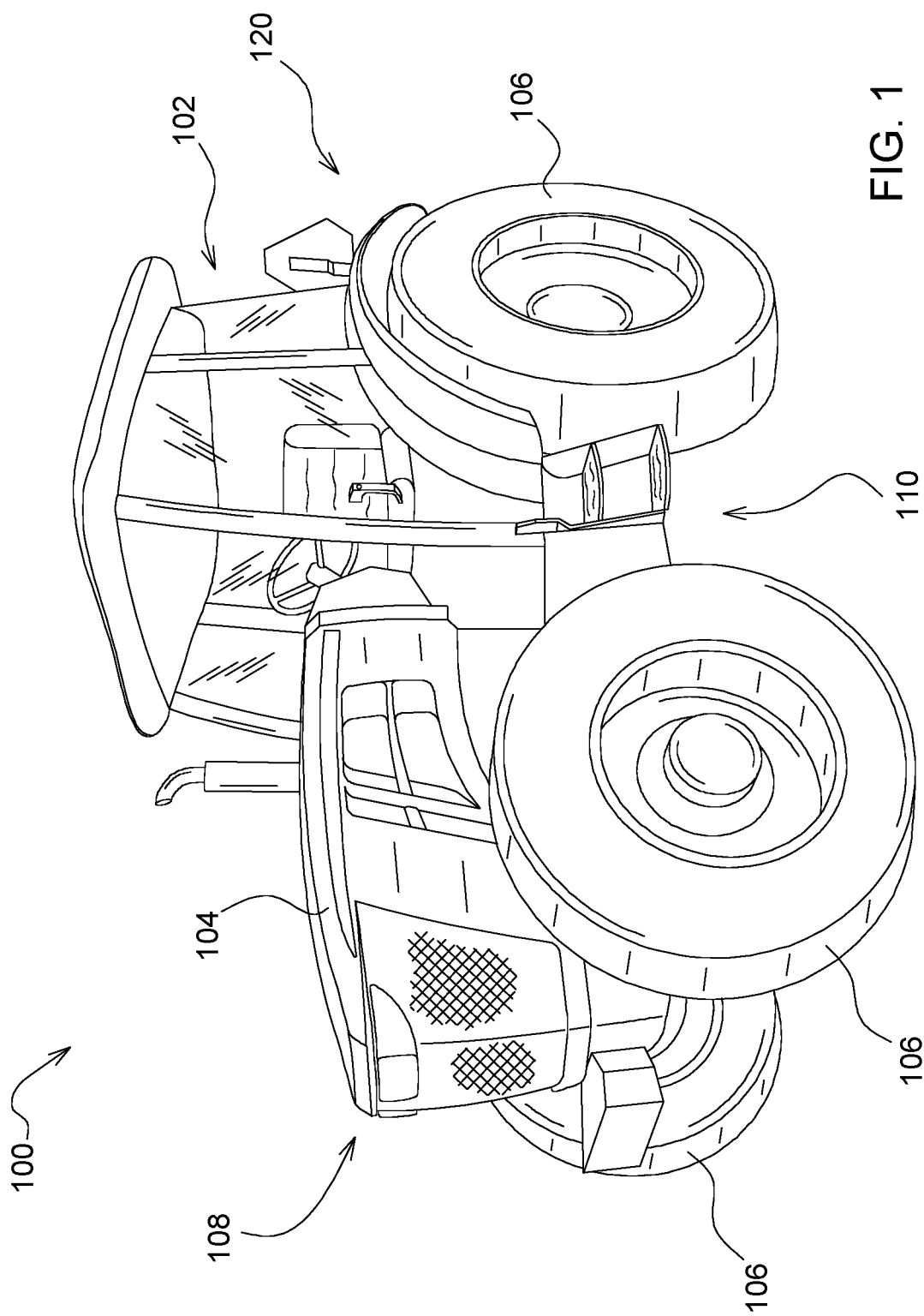
FIG. 1 is a perspective view of a work vehicle including a retention apparatus, according to an implementation.

FIG. 1 illustrates an agricultural work vehicle 100, for example an agricultural tractor. This disclosure also applies to other types of work vehicles including, but not limited to, agriculture, construction, forestry, transportation, and road building vehicles. The agricultural work vehicle 100, hereinafter referred to as a work vehicle 100, can include a frame or chassis 110, an operator station or cab 102, and one or more ground engaging apparatus 106, for example wheels or track assemblies. The work vehicle 100 can have a rigid frame 110 or an articulated frame 110. The work vehicle 100 can include a power source 108 positioned under a covering or hood 104 and a transmission transferring power to the ground engaging apparatus 106, hereinafter referred to as wheels 106, and one or more power take off shafts. The work vehicle 100 can include an operator interface having any number and combination of electronic devices, such as an interactive display. The work vehicle 100 can include a retention apparatus 120.

Figure 2:
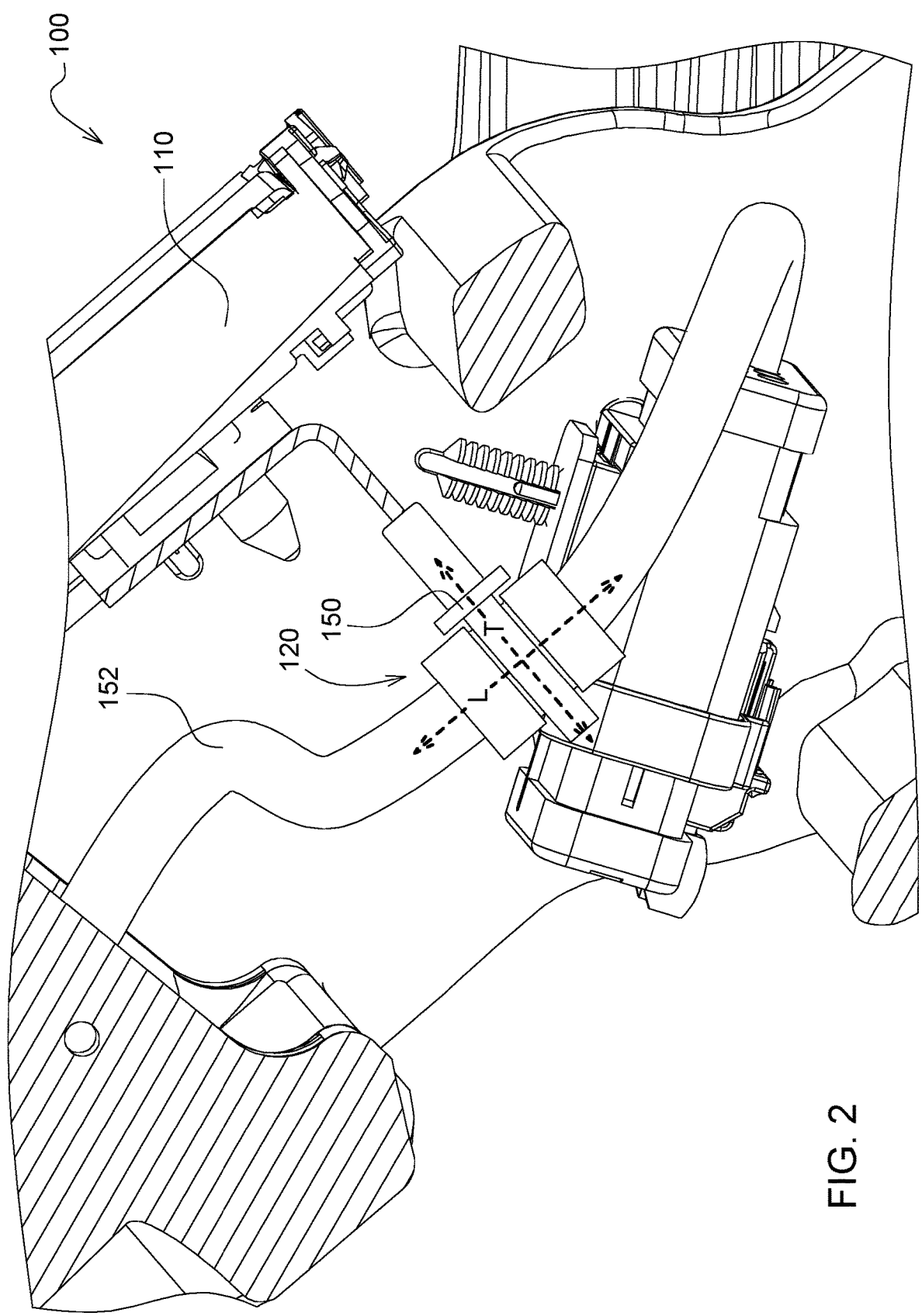
FIG. 2 is a perspective view of a retention apparatus in an installed condition, according to an implementation.
Figure 3:
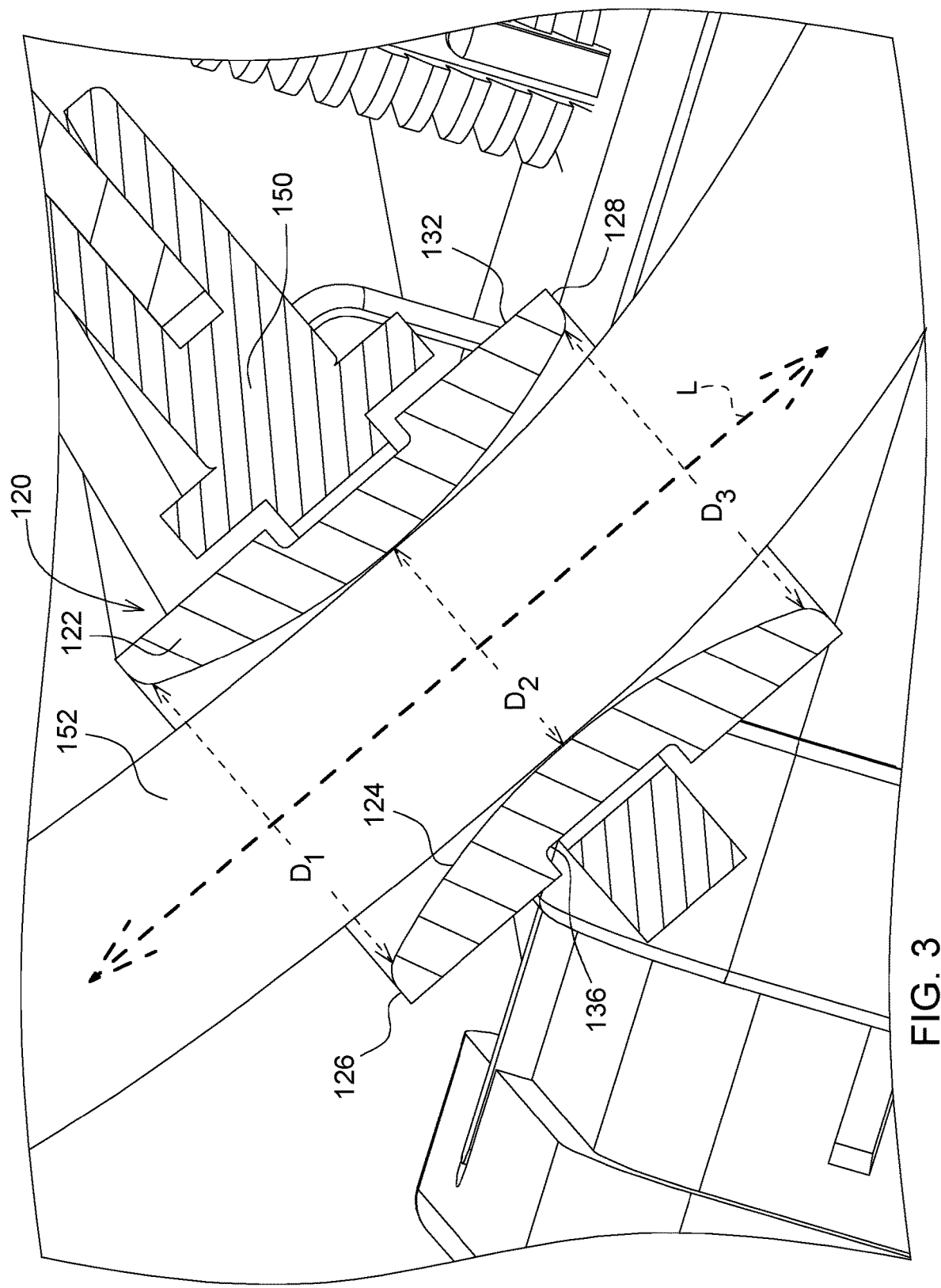
FIG. 3 is a cross sectional view of a retention apparatus along a longitudinal plane, according to an implementation.
Figure 4:
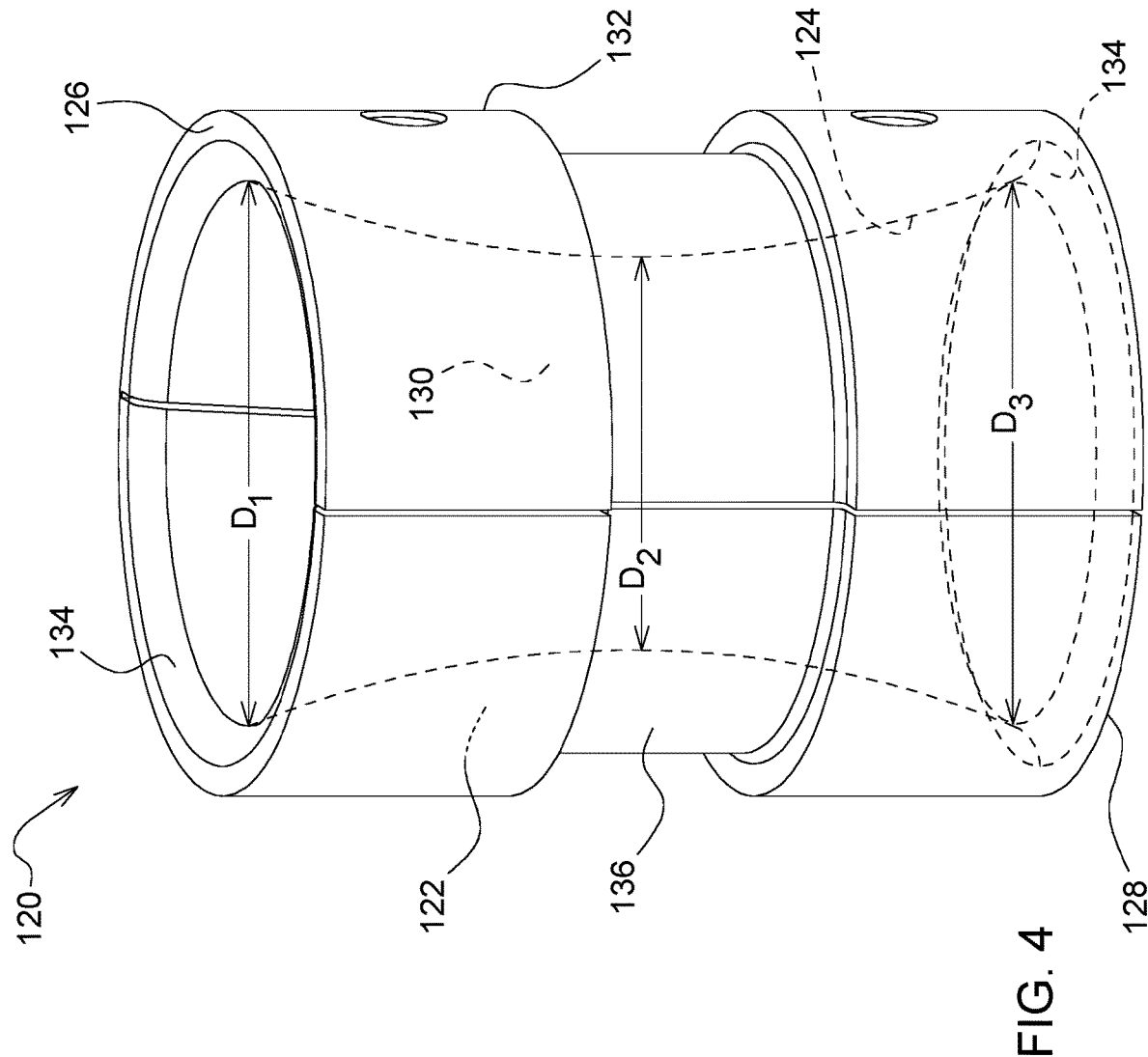
FIG. 4 is a perspective view of a retention apparatus, according to an implementation.

With reference to FIG. 2, the work vehicle 100 can include a retention apparatus 120 connected to the frame 110 with a clamp or retainer 150. The retention apparatus 120 retains a cable, hose, wire, pipe, tube, conduit, or line 152. The retention apparatus 120 retains the line 152 in a lateral or transverse direction T and allows the line 152 to move in the lengthwise or longitudinal direction L. The retention apparatus 120 also allows the line 152 to bend or rotate about a plurality of axis in the transverse plane.

With reference to FIGS. 3-6, a retention apparatus 120 can include a cylindrical or tubular wall or barrier 122 having an interior surface 124 and an exterior surface 132. The barrier 122 extends in an axial direction having a first end 126 and a second 128. The interior surface 124 defines an aperture 130 extending from the first end 126 to the second end 128. The barrier 122 has a first distance $D_1$ between opposing sides of the interior surface 124 at or near the first end 126. The barrier 122 has a second distance $D_2$ between opposing sides of the interior surface 124 at a position between the first end 126 and the second end 128. The second distance $D_2$ can be the narrowest portion of the interior surface 124. The second distance $D_2$ can be dimensioned to provide support for the line 152 and still allow the line 152 to move back and forth along the length or longitudinal axis of the retention apparatus 120. The second distance $D_2$ can equal to or greater than the outside dimension of the line 152. The second distance $D_2$ can be slightly larger than the outside dimension of the line 152. The barrier 122 is configured to partially surround and support a line 152, allowing the line 152 to move in lengthwise or longitudinal direction and rotationally about a lateral or transverse axis.

The barrier 122 has a third distance $D_3$ between opposing sides of the interior surface 124 at or near the second end 128. The first distance $D_1$ and third distance $D_3$ are larger than the second distance $D_2$. The first distance $D_1$ and third distance $D_3$ can be the same or different. The first distance $D_1$ can be larger or smaller than the third distance $D_3$. The interior surface 124 can curve from the first end 126 to the second end 128, with the narrowest portion of the interior surface 124 positioned between the first end 126 and the second end 128. The aperture 130 defined by the interior surface 124 is wider at the first and second ends 126, 128 than between the first and second ends 126, 128. The interior surface 124 can be smooth or even or can include longitudinal grooves or ridges. The exterior surface 132 can be cylindrical. The barrier 122 can include a groove or channel 136 in the exterior surface 132. The channel 136 can extend at least partially around the circumference of the retention apparatus 120. The channel 136 can extend entirely around the circumference of the retention apparatus 120. The channel 136 is dimensioned to receive a retainer 150 for attaching the retention apparatus 120 to the frame 110, as depicted in FIG. 2.

Figure 5:
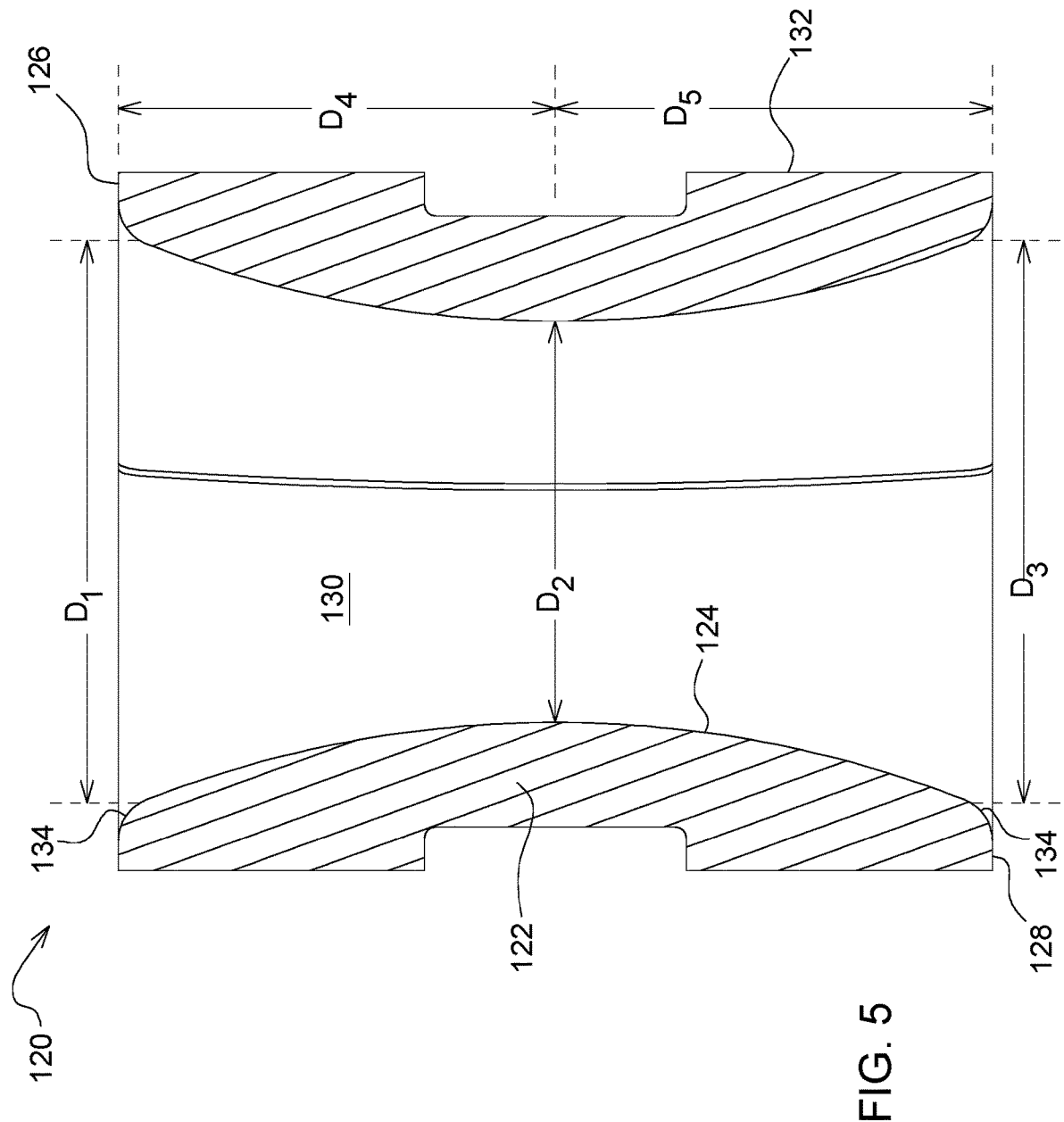
FIG. 5 is a cross sectional view of a retention apparatus along a longitudinal plane, according to an implementation.
Figure 6:
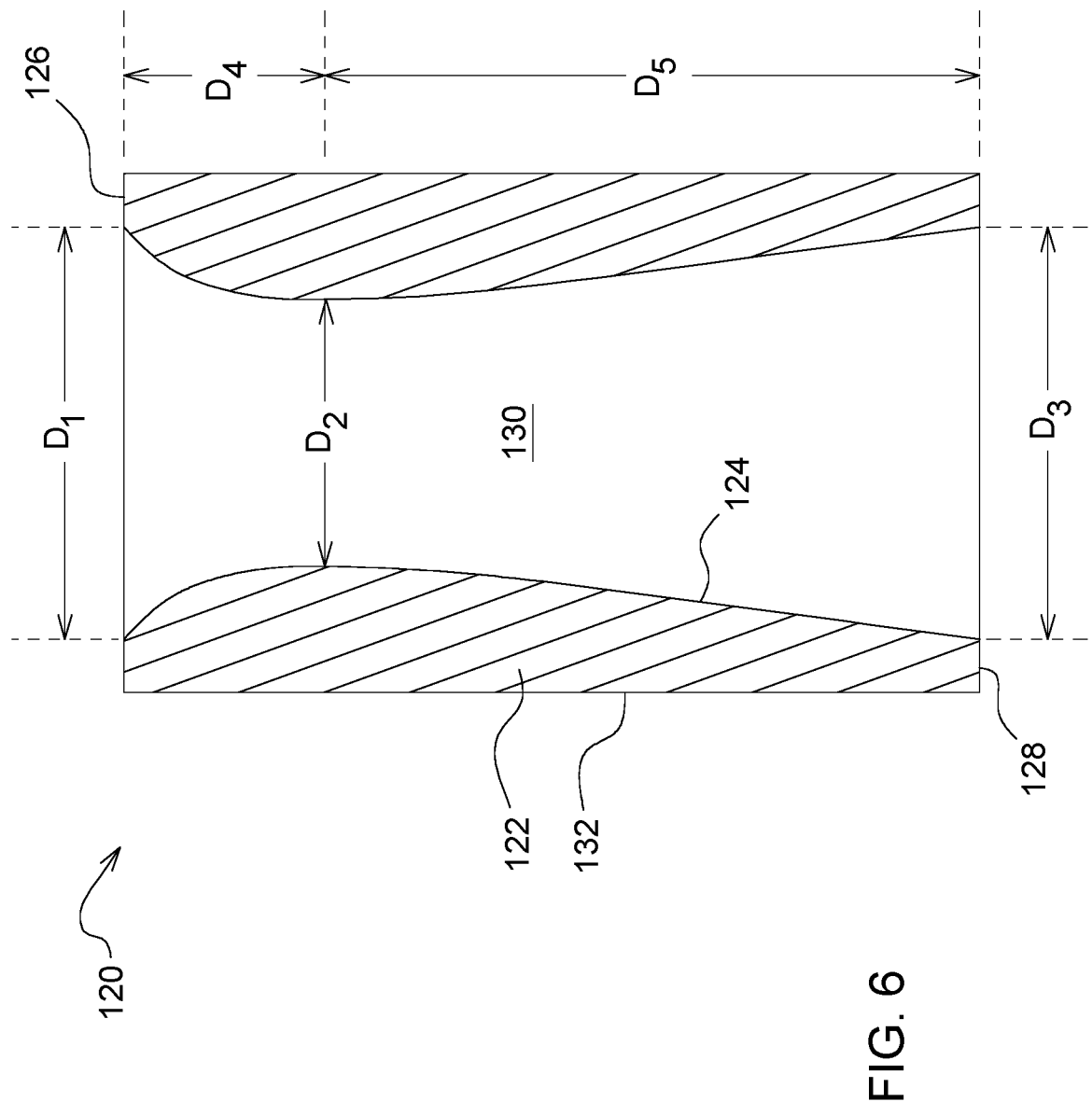
FIG. 6 is a cross sectional view of a retention apparatus along a longitudinal plane, according to an implementation.
Figure 8A:
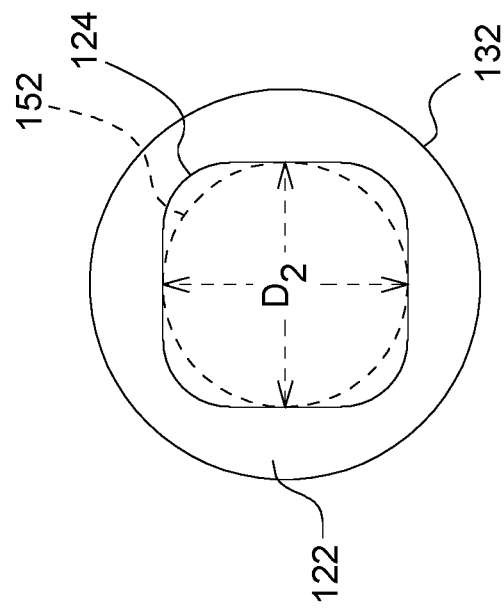
FIGS. 8A-8B are cross-sectional views along a transverse plane, according to an implementation.
Figure 8B:
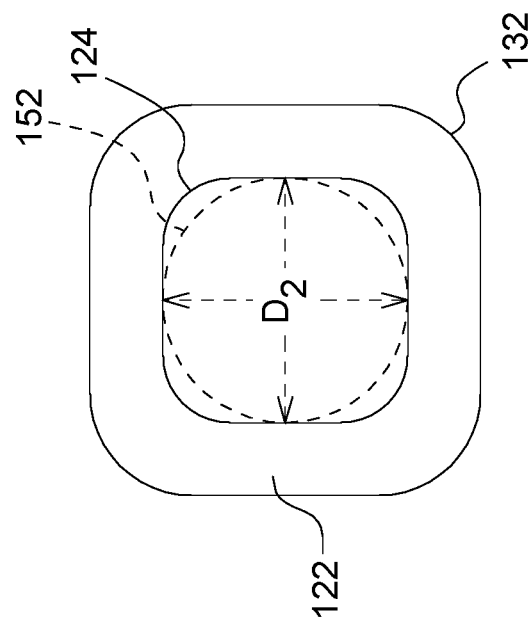

The position of the second distance $D_2$ is a fourth distance $D_4$ from the first end 126 of the retention apparatus 120. The position of the second distance $D_2$ is a fifth distance $D_5$ from the second end 128 of the retention apparatus 120. The second distance $D_2$ can be located halfway between the first end 126 and second 128, so that the fourth distance $D_4$ is the similar or same as the fifth distance $D_5$, as shown in FIG. 5. In some implementations, the second distance $D_2$ can be located closer to the first end 126 than the second end 128, as shown in FIG. 6. In other implementations, the second distance $D_2$ can be located closer to the second end 128 than the first end 126. When the position of the second distance $D_2$ is located closer to the first end 126 than the second end 128, the retention apparatus 120 allows more bending movement of the line 152 at the first end 126 than the second end 128.

With reference to FIGS. 7A-7D and 8A-8B, the retention apparatus 120 can have various cross-sections, according to some implementations. The cross-sections of the retention apparatus 120 are along a transverse plane at the position of the second distance $D_2$. The interior surface 124 can have a circular, elliptical, oval, polygonal, square, squircle, or other shaped cross-section. The exterior surface 132 can have a circular, elliptical, oval, polygonal, square, squircle, or other shaped cross-section. Various shapes allow different movement of the line 152. In one implementation, the elliptical shape depicted in FIG. 7B allows more bending of the line 152 along the first transverse axis $T_1$ than the second transverse axis $T_2$. In another implementation, the oval shape depicted in FIG. 7D allows the line 152 limited movement along the first transverse axis $T_1$, but restricts movement along the second transverse axis $T_2$. In other implementations, the square or squircle shape depicted in FIGS. 8A-8B allows more bending in the direction of the corners. Different shapes can be selected or designed to restrict movement in certain directions and allow limited movement in other directions. Different shapes can be selected or designed to allow more bending in certain directions and allow less bending in other directions.

Without in any way limiting the scope, interpretation, or application of the claims appearing below, a technical effect of one or more of the example implementations disclosed herein is a retention apparatus for a work line of a work vehicle or implement. The retention apparatus constrains movement of the work line in a transverse direction and allows movement of the work line in a longitudinal direction. The retention apparatus allows bending of the work line about an axis in the transverse direction.

The terminology used herein is for describing particular implementations and is not intended to be limiting of the disclosure. As used herein, the singular forms "a," "an," and "the" are intended to include the plural forms as well, unless the context clearly indicates otherwise. It will be further understood that the use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof. One or more of the steps or operations in any of the methods, processes, or systems discussed herein may be omitted, repeated, re-ordered, combined, or separated and are within the scope of the present disclosure.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example implementations of the present disclosure, these descriptions should not be viewed in a restrictive or limiting sense. Rather, there are several variations and modifications which may be made without departing from the scope of the appended claims.

What is claimed is:

1. A retaining apparatus comprising:
   a barrier having an interior surface defining an aperture extending from a first end of the barrier to a second end of the barrier;
   a first distance between opposing sides of the interior surface near the first end of the barrier;
   a second distance between the opposing sides of the interior surface at a position between the first and second ends of the barrier; and
   a third distance between the opposing sides of the interior surface at the second end of the barrier;
   wherein the second distance is smaller than the first and third distances;
   wherein the interior surface is configured to partially surround and support a work line, restricting movement of the work line in a transverse direction, allowing movement of the work line in a longitudinal direction, and allowing bending of the work line about an axis in the transverse direction; and
   wherein a cross-section in the transverse direction of the interior surface at the position of the second distance is non-circular.

2. The retaining apparatus of claim 1, wherein the interior surface curves from the first end to the second end of the barrier, wherein the aperture is wider at the first and second ends than between the first and second ends.

3. The retaining apparatus of claim 1, wherein an exterior surface of the barrier includes a channel extending entirely around the circumference of the retention apparatus.

4. The retaining apparatus of claim 1, wherein an exterior surface of the barrier is cylindrical.

5. The retaining apparatus of claim 1, wherein the second distance is positioned halfway between the first and second ends of the barrier.

6. The retaining apparatus of claim 1, wherein the second distance is positioned closer to the first end of the barrier than the second end of the barrier.

7. The retaining apparatus of claim 1, wherein the first distance is the same as the third distance.

8. The retaining apparatus of claim 1, wherein the first distance is larger than the third distance.

9. The retaining apparatus of claim 1, wherein the interior surface includes a plurality of longitudinal grooves.

10. The retaining apparatus of claim 1, wherein a cross-section in the transverse direction of the exterior surface at the position of the second distance is non-circular.

11. The retaining apparatus of claim 1, wherein the interior surface includes a plurality of longitudinal grooves, and wherein a cross-section in the transverse direction of the exterior surface at the position of the second distance is non-circular.

12. A retaining apparatus comprising:
    a barrier having an interior surface defining an aperture extending from a first end of the barrier to a second end of the barrier;
    a first distance between opposing sides of the interior surface near the first end of the barrier;
    a second distance between the opposing sides of the interior surface at a position between the first and second ends of the barrier; and
    a third distance between the opposing sides of the interior surface at the second end of the barrier;
    wherein the second distance is smaller than the first and third distances;
    wherein the interior surface is configured to partially surround and support a work line, restricting movement of the work line in a transverse direction, allowing movement of the work line in a longitudinal direction, and allowing bending of the work line about an axis in the transverse direction; and
    wherein a cross-section in the transverse direction of the exterior surface at the position of the second distance is non-circular.

13. A retaining apparatus comprising:
    a barrier having an interior surface defining an aperture extending from a first end of the barrier to a second end of the barrier;
    a first distance between opposing sides of the interior surface near the first end of the barrier;
    a second distance between the opposing sides of the interior surface at a position between the first and second ends of the barrier; and
    a third distance between the opposing sides of the interior surface at the second end of the barrier;
    wherein the second distance is smaller than the first and third distances;
    wherein the interior surface is configured to partially surround and support a work line, restricting movement of the work line in a transverse direction, allowing movement of the work line in a longitudinal direction, and allowing bending of the work line about an axis in the transverse direction; and
    wherein the interior surface includes a plurality of longitudinal grooves.

* * * * *